United States Patent [19]

Stewart

[11] 4,222,280
[45] Sep. 16, 1980

[54] SPEED CHANGING UNIT CONSTRUCTION

[76] Inventor: Donald M. Stewart, 11420 State Rte. 165, Salem, Ohio 44460

[21] Appl. No.: 935,530

[22] Filed: Aug. 21, 1978

[51] Int. Cl.³ .............................................. F16H 7/10
[52] U.S. Cl. .................................. 474/112; 248/534; 46/78; 244/54
[58] Field of Search ................... 74/230.01, 230.3, 396, 74/397, 242.16; 248/639, 554, 557, 674, 637; 46/78; 416/170 R; 244/54

[56] References Cited

U.S. PATENT DOCUMENTS

| 891,697 | 6/1908 | Huff | 248/674 |
|---|---|---|---|
| 1,323,490 | 12/1919 | Putnam | 74/242.16 |
| 1,393,990 | 10/1921 | Ford | 74/242.16 |
| 1,549,845 | 8/1925 | Munz | 74/397 |
| 2,436,504 | 2/1948 | Duncklee | 74/242.16 |
| 2,618,163 | 11/1952 | Russell | 74/242.16 |
| 4,011,670 | 3/1977 | Hutchings et al. | 74/242.16 |
| 4,108,401 | 8/1978 | Sullivan | 46/78 |
| 4,138,901 | 2/1979 | Fortin et al. | 74/242.16 |

Primary Examiner—Kenneth Dorner
Attorney, Agent, or Firm—Frease & Bishop

[57] ABSTRACT

A speed changing unit preferably for use on a model aircraft or powered foot-launched aircraft. A usual engine is mounted on a frame which in turn is adapted to be mounted on the frame of an aircraft. A pair of pulleys are mounted on the frame in a spaced relationship with a drive belt drivingly interconnecting the pulleys. One of the pulleys is mounted on the drive shaft of the engine for positive rotation with the drive shaft. The other pulley is rotatably mounted on a stationary eccentric shaft which is adjustably mounted on the frame. A propeller is mounted directly on this other pulley for rotation therewith when driven by the engine drive shaft and belt. Manual rotation of the eccentric shaft within its mounting adjusts the spacing between the spaced pulleys permitting different size drive shaft pulleys to be used with a standard drive belt to achieve different propeller speeds and thrust characteristics for a particular aircraft.

10 Claims, 17 Drawing Figures

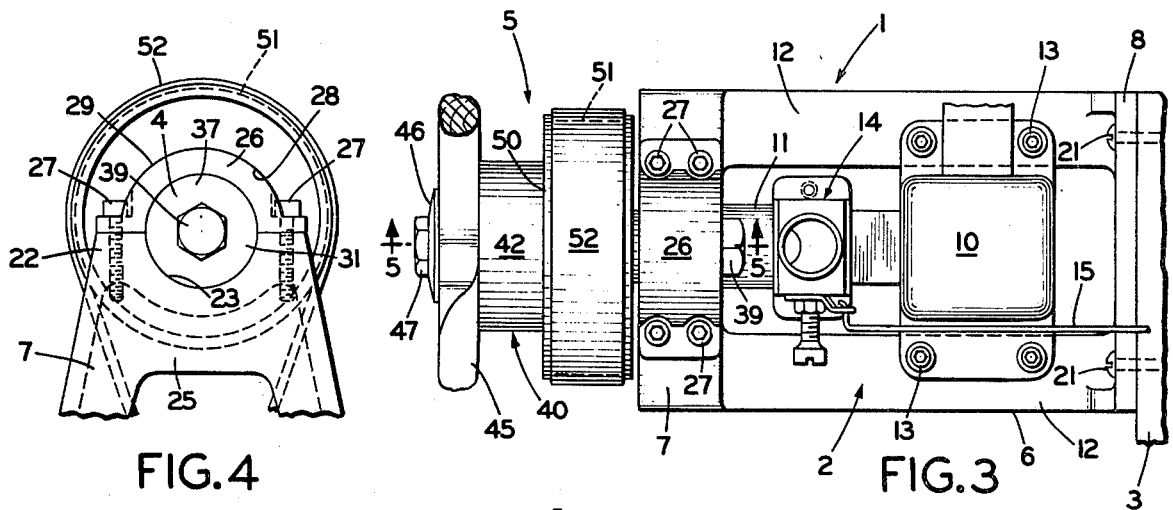
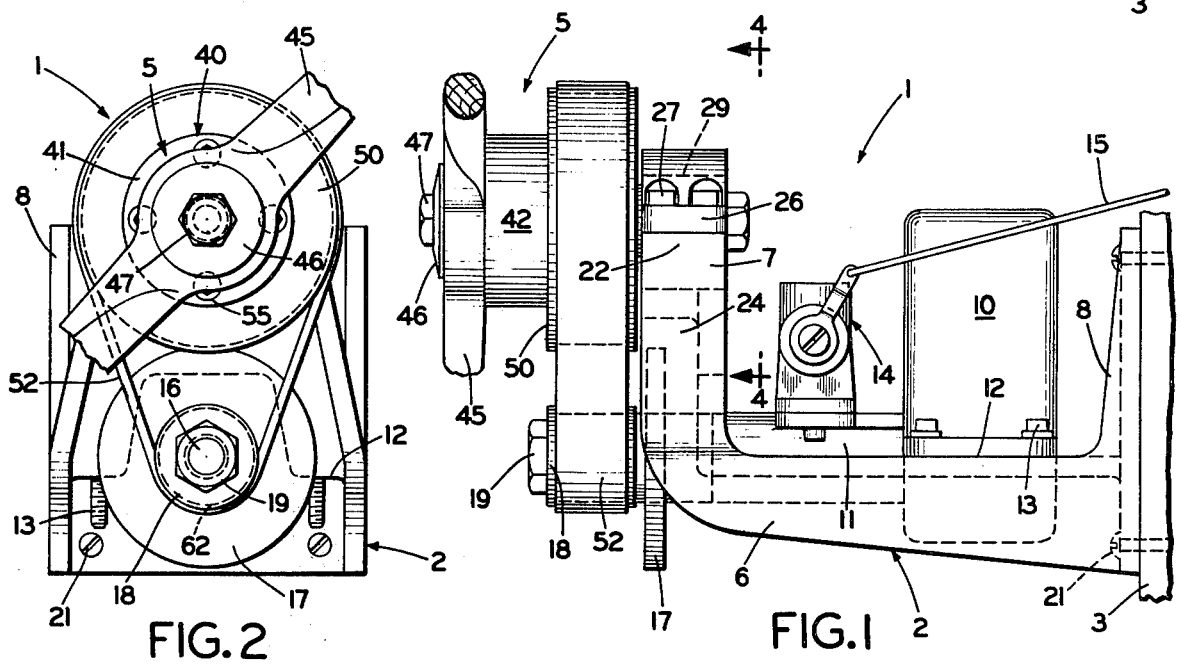
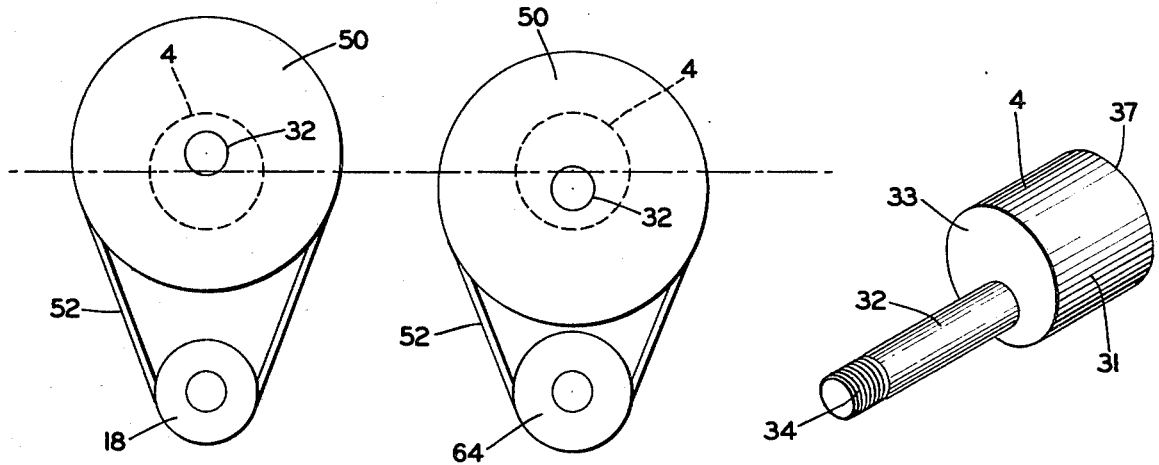

SPEED CHANGING UNIT CONSTRUCTION

BACKGROUND OF THE INVENTION

1. Field of the Invention

The invention relates to speed changing apparatus, and in particular to a unit which is adapted to mount an engine on an aircraft for changing the speed of the aircraft propeller. More particularly, the invention relates to such a unit having an adjustable eccentrically mounted stationary shaft which can be manually rotated to a selected fixed position to change the drive ratio between the propeller and a belt connected drive shaft pulley.

2. Description of the Prior Art

Most model aircraft are driven by gas engine driven propellers in which the propeller is mounted directly on the engine drive shaft to supply the power and thrust for the aircraft. Various aircraft operating and flight characteristics can be achieved by changing the propeller size or the speed at which the propeller is driven. This enables various operating characteristics and performance levels to be achieved by the model aircraft, many of which are remote or radio controlled.

Heretofore, the propeller size and configuration had to be changed in order to achieve these various operating characteristics since the speed of the drive shaft remains constant dependent upon the particular engine being used for turning the propeller. Otherwise, a different engine with different torque and speed characteristics would be required to replace the existing engine. Such changeovers are expensive and time consuming to most model aircraft owners and operators.

Recently, motorized or engine powered hang gliders have been developed, also referred to as powered foot launched aircraft. These aircraft also use an engine driven propeller to provide the thrust for driving the aircraft. It also is desirable to be able to adjust the amount of thrust and the operating characteristics, such as the speed and thrust of the propeller for these foot launched aircraft. This enables different flight characteristics to be achieved which can be adjusted in relationship to the weight and strength of a particular pilot, wind and weather conditions at time of flight, and particular terrain over which the aircraft is to be flown.

It also is difficult for many aircraft designs to change the existing engine with a different type or size engine without considerable modifications to the frame due to the particular engine mounting arrangement used for each type of aircraft.

Therefore, the need has existed for a speed changing unit in which the engine is mounted directly on the unit, which in turn is mounted on the frame of an aircraft to eliminate modifying the aircraft and components thereof for mounting of the engine directly to the aircraft frame, as in prior constructions. Furthermore, the speed changing unit should enable the propeller speed to be adjusted to meet desired flight characteristics for the aircraft without replacing the engine or propeller itself in a simple, economic and convenient manner.

Prior aircraft speed changers have used a pair of spaced rotating shafts, each of which has a pulley mounted thereon with a connecting drive belt extending therebetween. One of the shafts is the engine drive shaft. The propeller is mounted on the other or driven shaft. This driven shaft must be rotatably supported in bearings with the belt engaged pulley and propeller being fixed on the shaft for rotation with the shaft. In order to change the thrust or speed of the aircraft and propeller, various size pulleys are used with complementary size belts. This requires replacement both of the pulley and drive belt each time a different speed and thrust characteristic is desired. This requires additional components with the increased cost factors.

In nonanalagous art, an eccentric mechanism has been used to avoid replacing the drive belt for each different size drive pulley. One such arrangement is shown in U.S. Pat. No. 1,323,490 for a grinding machine. Such an eccentrically mounted drive arrangement uses a pair of spaced shafts, both of which are rotatably mounted, and in which the eccentrically mounted pulley shaft is the drive shaft. This arrangement requires three separate components, namely, a shaft, a pulley fixedly mounted on the shaft, and a propeller fixedly mounted on the extended end of the shaft. All of these components require increasing unnecessarily the weight of the unit which is undesirable for aircraft application.

Thus, there is no speed changing unit of which I am aware that is intended primarily for changing the speed and thrust of an aircraft propeller, which uses an eccentric mounting arrangement having a stationary shaft with a pulley-propeller assembly rotatably mounted thereon which requires only replacement of a single pulley on the drive shaft and manual adjustment of the eccentric for achieving various operating and flight characteristics for the aircraft.

SUMMARY OF THE INVENTION

Objectives of the invention include providing a speed changing unit construction which is intended primarily for use on model aircraft or on powered foot launched aircraft, whereby only the size of the drive shaft pulley need be changed to achieve various operating characteristics eliminating the heretofore changing or replacing of the drive belt or propeller, by mounting the propeller directly on a driven pulley, and in which the driven pulley and propeller is rotatably mounted on a stationary shaft eccentrically adjustably mounted on a frame; providing such a speed changing unit in which the aircraft engine is adapted to be mounted on the unit's frame, which in turn is adapted to be mounted on the frame of the aircraft, thereby eliminating the mounting of the engine directly on the aircraft frame which heretofore may have required modifying the aircraft frame and supporting components each time a different engine is used with the aircraft; providing such a speed changing unit construction in which the direct mounting of the propeller on the driven pulley, which combination in turn is rotatably mounted on a stationary shaft, reduces the weight of the speed changer as well as the friction losses since the number of rotating components heretofore required for speed changing units is reduced; providing such a speed changing unit construction which enables an engine's operating characteristics to be changed to provide quieter and more efficient operation, that is, more thrust with less noise, which is especially beneficial and desirable for hang glider-type aircraft where the pilot is located closely adjacent to the engine; providing such a speed changing unit construction in which the frame, in addition to providing convenient replacement of the aircraft engine without modification of the aircraft itself, can be formed of a lightweight cast metal, sich as aluminum, which also will function as a "heat sink" to absorb engine heat, thereby increasing engine efficiency and life without adding appreciable weight to the aircraft; providing such a speed changing unit construction in which the eccentric mounting of the propeller mounting shaft is a part of the engine mounting frame and is completely independent of the type and size of engine and propeller which is being used to provide the desired flexibility and range of operating characteristics, and in which the eccentrically mounted shaft can be adjusted easily by a simple, manual manipulation of the shaft without disassembling the speed changing unit or mounted engine; and providing such a speed changing unit construction which achieves the stated objectives simply, effectively and efficiently with relatively few components, and which is safe, sturdy and durable in use.

These objectives and advantages are obtained by the improved speed changing unit construction, the general nature of which may be stated as including frame means; engine means mounted on the frame means, with said engine means having a drive shaft rotatably mounted with respect to the frame means and extending outwardly from the frame means; first pulley means mounted on an extended end of the drive shaft for rotation with said drive shaft; stationary second shaft means adjustably mounted in a selected stationary position eccentrically on the frame means and extending parallel with and spaced from the engine means drive shaft; second pulley means rotatably mounted on the stationary second shaft means; propeller means mounted on the second pulley means for rotation with the second pulley means; and belt means extending between and operatively engageable with the first and second pulley means for rotating the first and second pulley means and propeller means upon rotation of the engine means drive shaft.

BRIEF DESCRIPTION OF THE DRAWINGS

Preferred embodiments of the invention - illustrative of the best mode in which applicant has contemplated applying the principle - are set forth in the following description and shown in the accompanying drawings, and are particularly and distinctly pointed out and set forth in the appended claims.

FIG. 1 is a side elevational view of the improved speed changing unit construction shown mounted on a portion of an aircraft frame;

FIG. 2 is a left-hand end elevational view of the speed changing unit construction shown in FIG. 1;

FIG. 3 is a top plan view of the speed changing unit construction shown in FIG. 1;

FIG. 4 is a fragmentary elevational view looking in the direction of arrows 4—4, FIG. 1;

FIG. 7 is a perspective view of the eccentric stub shaft of the improved speed changing unit;

FIGS. 8 and 9 are diagrammatic views showing the two extreme portions of the eccentrically mounted propeller pulley in combination with two different size engine drive shaft pulleys;

Similar numerals refer to similar parts throughout the drawings.

DESCRIPTION OF THE PREFERRED EMBODIMENTS

First Embodiment

Figure 5:
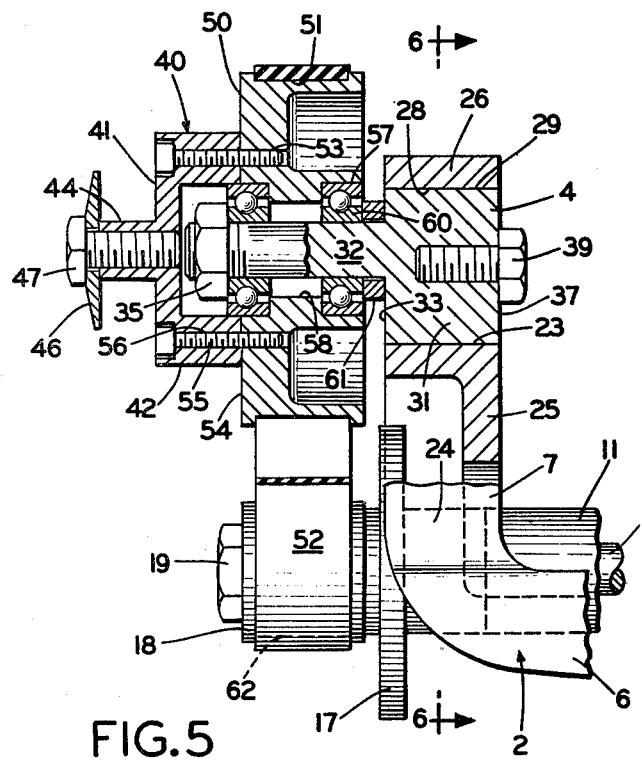
FIG. 5 is an enlarged fragmentary sectional view taken on line 5—5, FIG. 3.

The improved speed changing unit construction is indicated generally at 1, and is shown particularly in FIGS. 1-6. Unit 1 includes a frame assembly 2 which is adapted to be mounted on a mounting plate 3 or other portion of an aircraft with which unit 1 is intended to be used. An eccentric stub shaft 4 (FIG. 7) is adjustably mounted on frame assembly 2 for rotatably supporting a propeller-pulley assembly, indicated generally at 5.

Frame assembly 2 preferably is formed of a lightweight cast metal, such as aluminum. Assembly 2 has a generally U-shaped configuration and includes a horizontal base 6 and front and rear vertical supports 7 and 8, respectively. A usual, preferably gasoline powered engine 10 (shown generally diagrammatically) is adapted to be mounted on a pair of spaced ribs 12, which form base 6, by a plurality of mounting bolts or screws 13. An engine speed control component or carburetor is indicated generally diagrammatically at 14, and is shown mounted on the engine drive shaft housing 11. Carburetor 14 may include a lever 15 which extends to the aircraft control system for controlling the fuel flow to engine 10, as in a usual model aircraft construction. Engine 10 includes a drive shaft 16 (FIG. 6) which is located with housing 11 and which extends outwardly from engine 10 and beyond the front frame support 7. A dampner 17 preferably is mounted on drive shaft 16 adjacent support 7 to reduce torsional vibration effects on the drive belt and to provide a flywheel effect. A drive pulley 18 is fixedly mounted on the extended end of drive shaft 16 by a bolt 19 for rotation with shaft 16.

The rear vertical support 8 of frame 2 is formed with a plurality of holes for receiving bolts 21 to mount frame assembly 2 on mounting plate 3 of an aircraft.

The top portion 22 of front support 7 (FIG. 6) is formed with a concave semicircular recess 23. Top portion 22 is connected with spaced ribs 12 of base 6 by a pair of outwardly extending angled legs 24 which are connected by a reinforcing flange 25. A generally U-shaped shaft retaining strap 26 is mounted in an inverted position on top portion 22 of front support 7 by a plurality of bolts 27. Strap 26 has an inverted semicircular recess 29 which, together with recess 23, forms a horizontally extending bore 28 in front support 7 of frame assembly 2.

Figure 6:
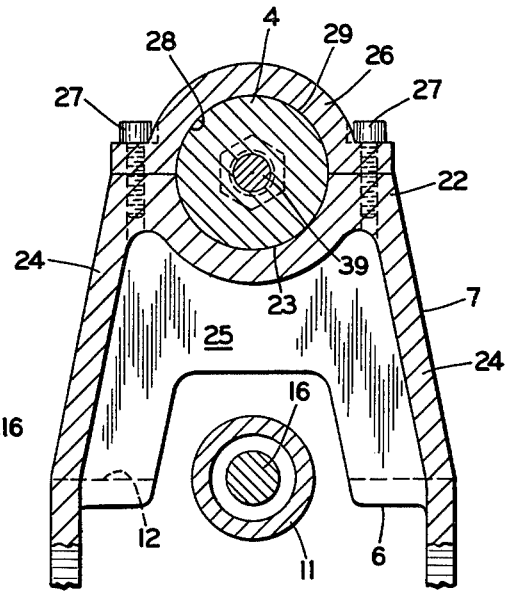
FIG. 6 is a fragmentary sectional view taken on line 6—6, FIG. 5.

In accordance wth the invention, eccentric stub shaft 4 (FIGS. 5 and 7) is mounted within frame bore 28. Stub shaft 4 preferably is formed as a single piece and includes an enlarged cylindrically shaped rear end portion 31 and a reduced diameter cylindrically shaped elongated front shaft portion 32 which extends outwardly from the circular front end surface 33 of rear portion 31. The axis of front shaft portion 32 is offset with respect to the axis of rear portion 31 to provide an eccentric mounting of shaft portion 32 with respect to rear shaft portion 31. The outer extended end of reduced shaft portion 32 is threaded at 34 for receiving a retaining nut 35 thereon. A threaded hole 36 (FIG. 5) extends concentrically inwardly from the center of end face 37 of rear end portion 31 for receiving an adjusting bolt 39 therein. The diameter of cylindrical rear end portion 31 is generally complementary to the diameter of frame bore 28, enabling stub shaft 4 to be mounted therein and secured in a clamped position, as shown in FIGS. 5 and 6, in front support 7 by retaining strap 26.

Another important feature of the invention is the mounting of propeller-pulley assembly 5 on stationary stub shaft portion 32. Assembly 5 includes a propeller mounting hub 40 which has a generally cup-shaped configuration formed by a radial base 41 and a cylindrical-shaped axially extending side wall 42. A pilot sleeve 44 extends axially outwardly from the center of base 41 for mounting a propeller 45 thereon. Propeller 45 is clamped against base 41 by a washer 46 and bolt 47.

Propeller-pulley assembly 5 further includes a pulley 50 which has an annular configuration and is provided with a peripheral groove 51 for receiving an endless drive-belt 52 therein. A plurality of threaded holes 53 extend axially inwardly from an annular front surface 54 of pulley 50 for receiving bolts 55 therein to mount propeller hub 40 on pulley 50. Bolts 55 extend through holes 56 which are formed in sidewall 42 of propeller hub 40.

A pair of internal, annular-shaped recesses 57 are formed in the cylindrical central bore forming surface 58 of pulley 50 for receiving a pair of bearing rings 60 therein. Bearing rings 60 are telescopically mounted on reduced front shaft portion 32 of stub shaft 4 for rotatably mounting propeller-pulley assembly 5 thereon.

Bearing rings 60 in turn are secured in position on shaft portion 32 and in abutting engagement with pulley 50 within pulley bore recesses 57 by stub shaft clamping nut 35. A spacer washer 61 is telescopically mounted on stub shaft portion 32 and is clamped between front face 33 of stub shaft 4 and the innermost bearing ring 60 (FIG. 5). Drive belt 52 is seated within a peripheral groove 62 formed in drive pulley 18 for drivingly coupling together pulley 18 with propeller-pulley assembly 5.

FIGS. 8 and 9 illustrate diagrammatically one manner in which speed changing unit 1 may be used. FIG. 8 illustrates a preselected position of unit 1, wherein driven pulley 50 is drivingly connected with drive shaft pulley 18 by belt 52. Stub shaft 4 has been adjusted so that stub shaft portion 32 is at a topmost position. To achieve a different aircraft operating condition, drive shaft pulley 18 has been replaced by a larger pulley 64 (FIG. 9). In order to eliminate replacing drive belt 52 with a different length belt to compensate for the larger pulley 64 as in prior constructions, stub shaft 4 is adjusted from the position of FIG. 8 to that of FIG. 9. This adjustment is accomplished easily by loosening retaining strap bolts 27 and rotating stub shaft 4 by an appropriate hand wrench engaged with adjusting nut 39. The rotation of stub shaft 4 from the position of FIG. 8 to that of FIG. 9 effectively moves propeller pulley 50 toward drive shaft pulley 64 to compensate for the increased size of pulley 64. FIGS. 8 and 9 merely illustrate two of the many different positions that stub shaft 4 may assume to compensate for various size drive shaft pulleys to eliminate replacing belt 52.

Thus, various aircraft operating and flight characteristics can be achieved simply by replacing drive shaft pulley 18 with a predetermined sized pulley. A corresponding adjustment of the vertical spacing between the belt connected pulley then is achieved by manual rotation of stationary stub shaft 4 within its mounting in frame bore 28. If desired, a different propeller 45 may be mounted on pilot sleeve 44 by temporary removal of washer 46 and bolt 47 to achieve even different and more varied aircraft operating characteristics. It is easily seen that replacement of pulley 18 with a larger pulley 64 (or smaller pulley) changes the drive ratio existing between the drive pulley 18 and driven pulley 50 to effect a change in propeller speed.

Another advantage of speed changing unit 1 is the ability to replace engine 10 with a different size or engine configuration without requiring any modification to the existing aircraft, since the engine is mounted directly on frame assembly 2. Another advantage achieved by this engine-mounting arrangement is the use of frame assembly 2 as a heat sink for the heat generated by engine 10. The frame metal effectively absorbs and evenly distributes the generated heat throughout the frame components for subsequent air cooling, thereby increasing engine efficiency and engine life.

Second Embodiment

A modified form of the improved speed changing unit construction is shown particularly in FIGS. 10-14, and is indicated generally by numeral 65. Modified unit 65 is of the type preferably intended for use on the hang glider or powered foot-launched aircraft, although it can be used with the remote controlled model aircraft, if desired. Modified unit 1 includes a base plate 67 which is adapted to be mounted on a frame of the aircraft.

Figure 12:
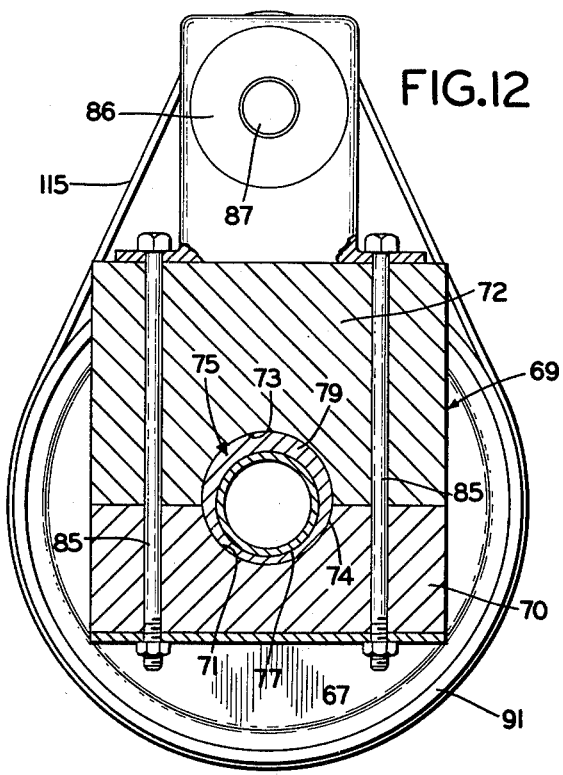
FIG. 12 is an enlarged transverse vertical sectional view taken on line 12—12, FIG. 11.
Figure 13:
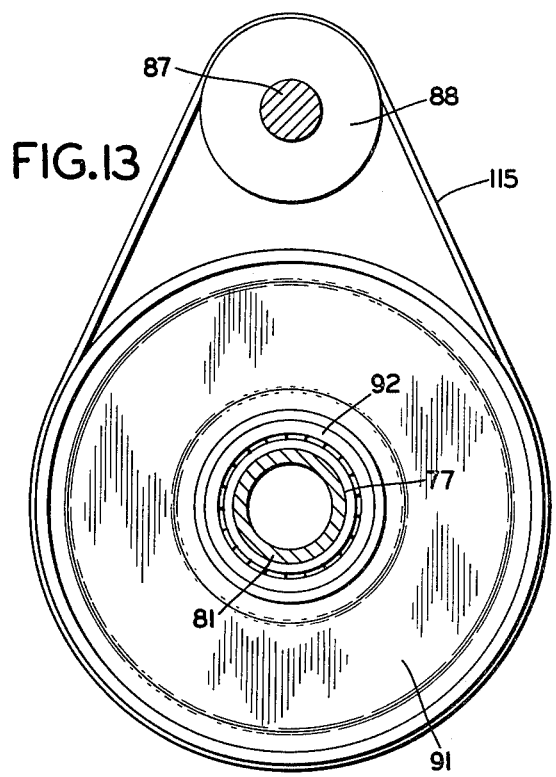
FIG. 13 is an enlarged transverse vertical sectional view taken on line 13—13, FIG. 11.
Figure 14:
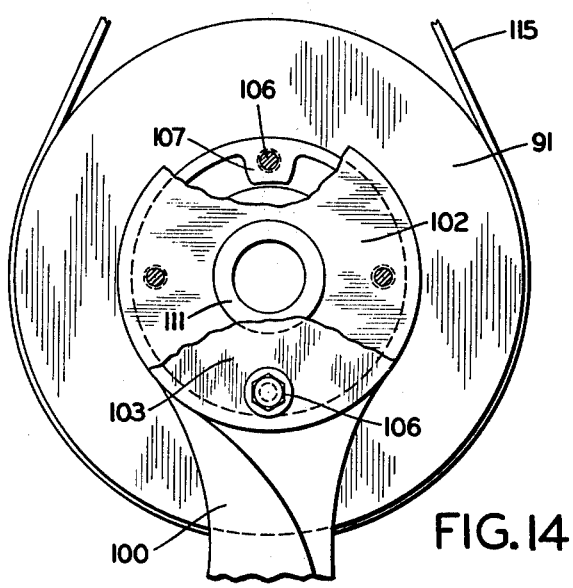
FIG. 14 is an enlarged fragmentary sectional view taken on line 14—14, FIG. 11.
Figure 16:
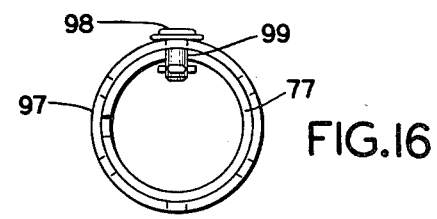
FIG. 16 is a left-hand end view of the eccentric shaft of FIG. 15.
Figure 17:
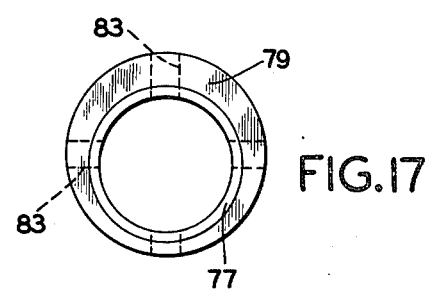
FIG. 17 is a right-hand end view of the eccentric shaft of FIG. 15.

A pair of saddle blocks, indicated generally at 68 and 69, are mounted on base plate 67 and extend vertically upwardly therefrom in a horizontal spaced relationship. Blocks 68 and 69 preferably are identical and each includes a lower section 70 formed with a semicircular recess 71 in the top portion thereof (FIG. 12.). Upper section 72 is formed with an inverted semicircular recess 73 in the bottom portion thereof, which aligns with lower section recess 71 to form a cylindrical horizontally extending bore 74 when sections 70 and 72 are joined together. Bores 74 are horizontally aligned for receiving an eccentric shaft 75 therein. Shaft 75 is shown particularly in FIGS. 15-17 and performs the same function as does eccentric stub shaft 4 of the above-described first embodiment.

Figure 10:
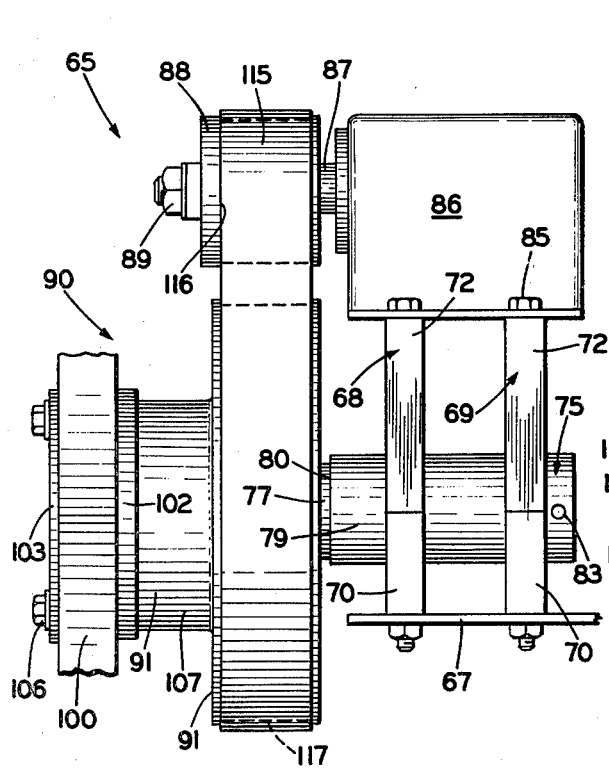
FIG. 10 is a fragmentary side elevational view of a modified speed changing unit construction mounted on a portion of an aircraft frame of the hang glider type.
Figure 11:
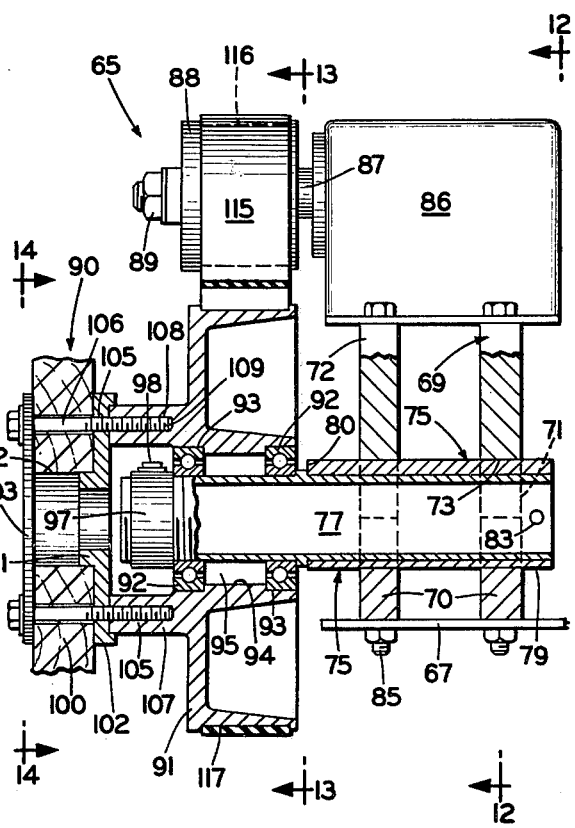
FIG. 11 is a view similar to FIG. 10, with portions broken away and in section.

Shaft 75 is formed by a section of cylindrical tubing 77, the inner end of which is threaded at 78. An eccentric sleeve 79 having a shorter length than tubing 77 is telescopically mounted on tubing 77, preferably with a force fit. The inner edge 80 of eccentric sleeve 79 abuts against a retaining ring 81 which is formed integrally with tube 77 or as a separate component which is firmly mounted thereon. A plurality of circumferentially spaced radially extending holes 83 are formed in the outer end of eccentric shaft 75. Holes 83 are adapted to receive a spanner wrench or similar tool for adjustably rotating shaft 75 within saddle blocks 68 and 69 in a similar manner as is adjusting nut 39 of stub shaft 4. Shaft 75 is clamped in an adjusted position between saddle block sections 70 and 72 by a plurality of bolts 85 which extend vertically throughout the lengths of saddle blocks 68 and 69. Bolts 85 also preferably mount the saddle blocks on base plate 67 and a drive engine 86 on the top portions of the saddle blocks, as shown in FIGS. 10–12.

Drive engine 86 has a usual drive shaft 87 on which a drive pulley 88 is mounted by a nut 89 for rotation with shaft 87 in a similar manner as is drive pulley 18 of the first embodiment. In accordance with the invention, a propeller-pulley assembly 90 is rotatably mounted on stationary shaft 75. Assembly 90 includes a driven pulley member 91 and a propeller 100.

Figure 15:
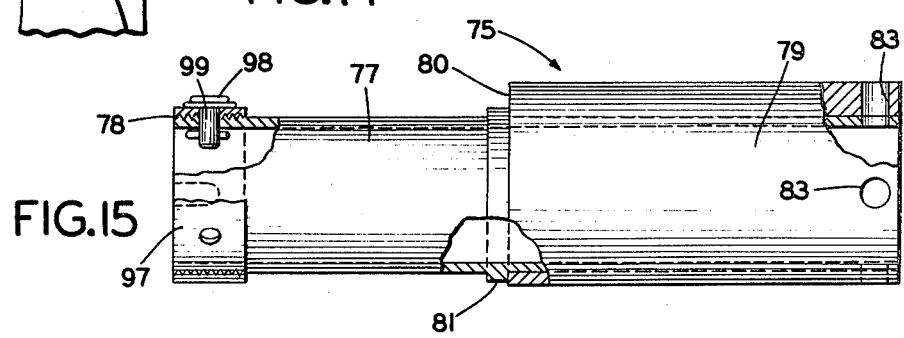
FIG. 15 is an enlarged elevational view with portions broken away and in section of the stationary eccentric shaft of the modified speed changing unit of FIGS. 10-14.

Pulley member 91 is rotatably mounted on the extended end of tube 77 of eccentric shaft 75 by a pair of bearing rings 92. Bearing rings 92 are telescopically mounted on tube 77 and are seated within a pair of spaced annular internal recesses 93 formed in the internal cylindrical surface 94 which forms pulley bore 95. The innermost bearing ring 92 is in abutting relationship with retaining ring 81. A sleeve nut 97 is adjustably mounted on threaded end 78 of eccentric shaft 75 and is in abutting engagement with the other bearing ring 92. Nut 97 clamps the bearing rings and pulley 91 on the cylindrical end of eccentric shaft 75 to rotatably mount pulley 91 thereon. A pin and clevis assembly 98 extends through aligned radial holes 99 formed in sleeve nut 97 and in the outer end of cylindrical tubing 77 to lock sleeve nut 97 in its clamping position (FIG. 15).

Propeller 100 is mounted on pulley 91 for rotation with the pulley on stationary eccentric shaft 75 by means of a hub plate 102 and a clamping plate 103. Hub plate 102 and clamping plate 103 are generally flat disc-shaped members which are formed with a plurality of horizontally aligned holes 105 for receiving bolts 106 therethrough for mounting the propeller on a pulley hub flange 107. The threaded inner ends 109 of bolts 106 are engaged in threaded holes 108 formed in pulley hub flange 107 (FIG. 11). Hub flange 107 is a cylindrical shaped member which is formed integrally with pulley 91 and extends axially concentrically outwardly from the main pulley body.

Hub plate 102 is provided with an axially extending central pilot sleeve 111 which is telescopically engaged within a portion of propeller bore 112 for centering propeller 100 on hub plate 102 and pulley 91.

An endless drive belt 115 or like member, similar to drive belt 52, is located in peripheral grooves 116 and 117 formed in drive pulley 88 and driven pulley 91, respectively, to drivingly couple pulley 91 with drive pulley 88 of engine 86.

The operation of modified speed changer 65 is similar to that of speed changer 1, described above. To change the operating characteristics or the speed of driven pulley 91 and attached propeller 100 without changing drive belt 115, drive pulley 88 is replaced by a different size pulley (not shown). Stationary eccentric shaft 75 then is manually rotated within its mounting on saddle blocks 68 and 69 to compensate for the difference in pulley size. This adjustment is accomplished easily by loosening of bolts 85, permitting rotation of eccentric shaft 75, preferably by use of a spanner wrench in holes 83.

IN GENERAL

Accordingly, speed changing units 1 and 65 provide a relatively simple and convenient assembly for obtaining various propeller speeds by changing the ratio between a driven pulley and its belt-coupled drive pulley by merely changing the size of the drive pulley without changing drive belt by manually rotating an eccentric stationary shaft on which a propeller-pulley assembly is rotatably mounted. The use of a stationary eccentrically mounted shaft eliminates the heretofore rotatable shaft and associated bearings which increases both the weight of the unit and frictional forces experienced thereby as in prior constructions. The improved speed changing unit construction enables various engine configurations, sizes and styles to be mounted on the unit without requiring any modification to the existing aircraft frame by using the existing engine mount holes, and in which the engine mounting frame serves as a heat sink for the engine. The use of a hollow eccentric shaft 75 for the modified speed changing unit permits various control wires and components to extend through the shaft for remotely controlling the propeller pitch for certain types of adjustable pitch propellers.

Accordingly, the improved speed changing unit provides a construction which is effective, sturdy and durable in use, which eliminates difficulties encountered with prior speed changers, which achieves the objectives indicated and which solves problems existing in the art.

In the foregoing description, certain terms have been used for brevity, clearness and understanding but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details of the construction shown or described.

Having now described the features, discoveries and principles of the invention, the manner in which the improved speed changing unit is constructed, assembled and operated, the characteristics of the new construction, and the advantageous, new and useful results obtained; the new and useful structures, devices, elements, arrangements, parts, and combinations are set forth in the appended claims.

I claim:
1. A speed changing unit construction including:
   (a) frame means having a generally U-shaped configuration with a vertically extending front support, a vertically extending rear mounting bracket, and a base extending generally horizontally between said front support and said rear bracket;
   (b) a bore formed in a top portion of the front support;
   (c) engine means mounted on the frame means, with said engine means having a drive shaft rotatably mounted with respect to the frame means;
   (d) first pulley means mounted on the drive shaft for rotation with said drive shaft;
   (e) stationary shaft means having a stub shaft with an enlarged cylindrical-shaped rear portion and a smaller diameter cylindrical-shaped front portion extending in an axial direction from the enlarged rear portion, with the axis of the front portion being offset from the axis of the rear portion, and with said rear portion being adjustably mounted within the bore of the front support;

(f) second pulley means rotatably mounted on the smaller diameter front portion of the stationary shaft means;

(g) propeller means mounted on the second pulley means for rotation with said second pulley means; and (h) belt means extending between and operatively engageable with the first and second pulley means for rotating said pulley means and propeller means by the engine means drive shaft.

2. The construction defined in claim 1 in which means is mounted on the enlarged rear portion of the stationary shaft means for manually rotating said shaft means within the bore of the frame means to a selected position to adjust the spacing between the first and second pulley means.

3. The construction defined in claim 1 in which the second pulley means includes a pulley formed with a belt receiving peripheral groove, bearing means mounted on the offset reduced diameter front portion of the stationary shaft means for rotatably mounting said pulley means on the offset front portion, and a propeller mounting hub attached directly to the pulley for rotation with said pulley.

4. The construction defined in claim 1 in which the engine means is mounted on the frame means base; and in which the rear bracket is adapted to be attached to the frame of an aircraft.

5. The construction defined in claim 1 in which the frame means is formed of cast aluminum.

6. In a speed changing unit construction of the type for mounting an engine on an aircraft and for changing the speed of a propeller for driving said aircraft including:

(a) frame means adapted to be mounted on an aircraft and to removably mount an engine thereof, said frame means having a generally U-shaped configuration formed by a pair of spaced vertical end brackets and a horizontal base extending therebetween;

(b) bore means formed in one of the end brackets of the frame means;

(c) eccentric shaft means adjustably mounted within the bore of the frame means with said shaft means having a cylindrical end portion and a reduced diameter front portion extending outwardly from the end portion with the axis of the front portion being offset with respect to the axis of the end portion, said shaft means being stationary except when manually rotated to an adjusted position; and (d) pulley means rotatably mounted on the eccentric shaft means, said pulley means being adapted to be drivingly connected to a drive shaft of the aircraft engine and to have a propeller mounted thereon for rotation with the pulley means.

7. The construction defined in claim 6 in which bearing means is telescopically mounted on the eccentric shaft means for rotatably mounting the pulley means.

8. The construction defined in claim 6 in which the frame means is formed of a lightweight metal which functions as a heat sink for an engine mounted thereon.

9. The construction defined in claim 6 in which means is provided on the eccentric shaft means for manually adjusting said shaft means within the bore means.

10. A speed changing unit for mounting an engine on an aircraft and for changing the speed of a propeller for driving said aircraft including:

(a) frame means having an upstanding front bracket, a rear mounting bracket and a horizontal base extending between said front and rear brackets, with said rear bracket being adapted to mount the frame means on an aircraft, and with said horizontal base being adapted to receivably mount an aircraft engine on the frame means;

(b) bore means formed in the upstanding front bracket of the frame means;

(c) eccentric shaft means adjustably mounted within the bore of the frame means front bracket with said shaft means having a cylindrical end portion and a reduced diameter front portion extending outwardly from the cylindrical end portion with the axis of the front portion being offset with respect to the axis of the end portion, and with said shaft means being stationary except when manually rotated to an adjusted position; and (d) pulley means rotatably mounted on the eccentric shaft means, said pulley means being adapted to be drivingly connected to a drive shaft of the aircraft engine and to have a propeller mounted thereon for rotation with the pulley means.

* * * * *